(12) United States Patent
Renders

(10) Patent No.: US 6,631,618 B2
(45) Date of Patent: Oct. 14, 2003

(54) METHOD AND DEVICE FOR TESTING AND DIAGNOSING AN AUTOMOTIVE AIR CONDITIONING SYSTEM

(75) Inventor: Marie Joseph Renders, Beersel (BE)

(73) Assignee: Ecotechnics, S.p.A. (IT)

( * ) Notice: Subject to any disclaimer, the term of this patent is extended or adjusted under 35 U.S.C. 154(b) by 0 days.

(21) Appl. No.: 10/051,839

(22) Filed: Jan. 17, 2002

(65) Prior Publication Data

US 2002/0116932 A1 Aug. 29, 2002

Related U.S. Application Data

(63) Continuation of application No. 09/445,007, filed as application No. PCT/EP98/03255 on Jun. 1, 1998, now Pat. No. 6,360,551.

(30) Foreign Application Priority Data

May 30, 1997 (IT) .......................................... FI97A0134

(51) Int. Cl.[7] ............................................... F25B 49/00
(52) U.S. Cl. ............................... 62/115; 62/127; 62/129
(58) Field of Search .......................... 62/125, 127, 129, 62/115

(56) References Cited

U.S. PATENT DOCUMENTS

| | | |
|---|---|---|
| 4,755,957 A | 7/1988 | White et al. |
| 4,798,055 A | 1/1989 | Murray et al. |
| 4,967,567 A | 11/1990 | Proctor et al. |
| 5,009,076 A | 4/1991 | Winslow |
| 5,231,841 A | 8/1993 | McClelland et al. |
| 5,295,360 A | 3/1994 | Olds et al. |
| 5,311,745 A * | 5/1994 | Lockhart et al. ............... 62/127 |
| 5,495,722 A | 3/1996 | Manson et al. |
| 5,743,465 A | 4/1998 | Jeong |
| 5,816,059 A | 10/1998 | Ficchi, Jr. et al. |
| 5,850,209 A | 12/1998 | Lemke et al. |
| 5,884,202 A | 3/1999 | Arjomand |

FOREIGN PATENT DOCUMENTS

WO WO94/08809 4/1994

* cited by examiner

Primary Examiner—William E. Tapolcai
(74) Attorney, Agent, or Firm—Welsh & Katz, Ltd.

(57) ABSTRACT

Test and diagnosis of an automotive air conditioning system (2) is performed by a device which comprises: temperature-sensing means (3) for sensing the ambient temperature, pressure-sensing means (4,5) for sensing the high and low side pressures of the system (2), data-storage means (62) for storing at least one set of reference values of refrigerant pressures and ambient temperatures and at least one set of malfunction diagnosis, a data processor (63) for comparing said sensed values of ambient temperature and refrigerant pressures with said stored reference values and for associating to each tern of sensed values at least one diagnosis, which is displayed on a display unit (7), an input unit (8) and an hand-heldable housing (10) for containing said sensing and data-storage means (3–5,62), said data processor (63) and said display and input units (7,8).

4 Claims, 2 Drawing Sheets

METHOD AND DEVICE FOR TESTING AND DIAGNOSING AN AUTOMOTIVE AIR CONDITIONING SYSTEM

This application is a continuation of U.S. patent application Ser. 09/445,007, filed Nov. 30, 1999 now U.S. Pat. No. 6,360,551, which is a 371 of PCT/EP98/03255 filed Jun. 1, 1998.

The present invention relates to a method and a device for testing and diagnosing an automotive air conditioning system.

From U.S. Pat. No. 4,755,957 and U.S. Pat. No. 4,967,567 methods and apparatus for servicing an automobile air conditioning system are already known in which electronic processing means including a microprocessor are provided for initially diagnosing the system.

It is an object of the present invention to provide an improved method and device for an effective, quick and simple test and diagnosis of an automotive air conditioning system. It is a further object of the present invention to provide a method for testing and diagnosing air conditioning system wherein it is considered only the type of refrigerant and whether the system has a compressor with fixed or variable capacity, irrespective of type of automobile and/or system manufacturer.

It is another object of the present invention to provide a hand-holdable, self-contained, contained, light-weight device which allows any operator to carry out efficient test and diagnosis of automotive air conditioning systems.

The above and other objects of the present inventions are accomplished by means of the method and device defined in the independent claims. Advantageous embodiments of the invention are defined in the dependent claims.

The invention will be now described by way of example and with reference to the accompanying drawings in which:

FIG. 1 schematically illustrates an air conditioning system with a testing and diagnosing device according to the invention;

Figure 1:
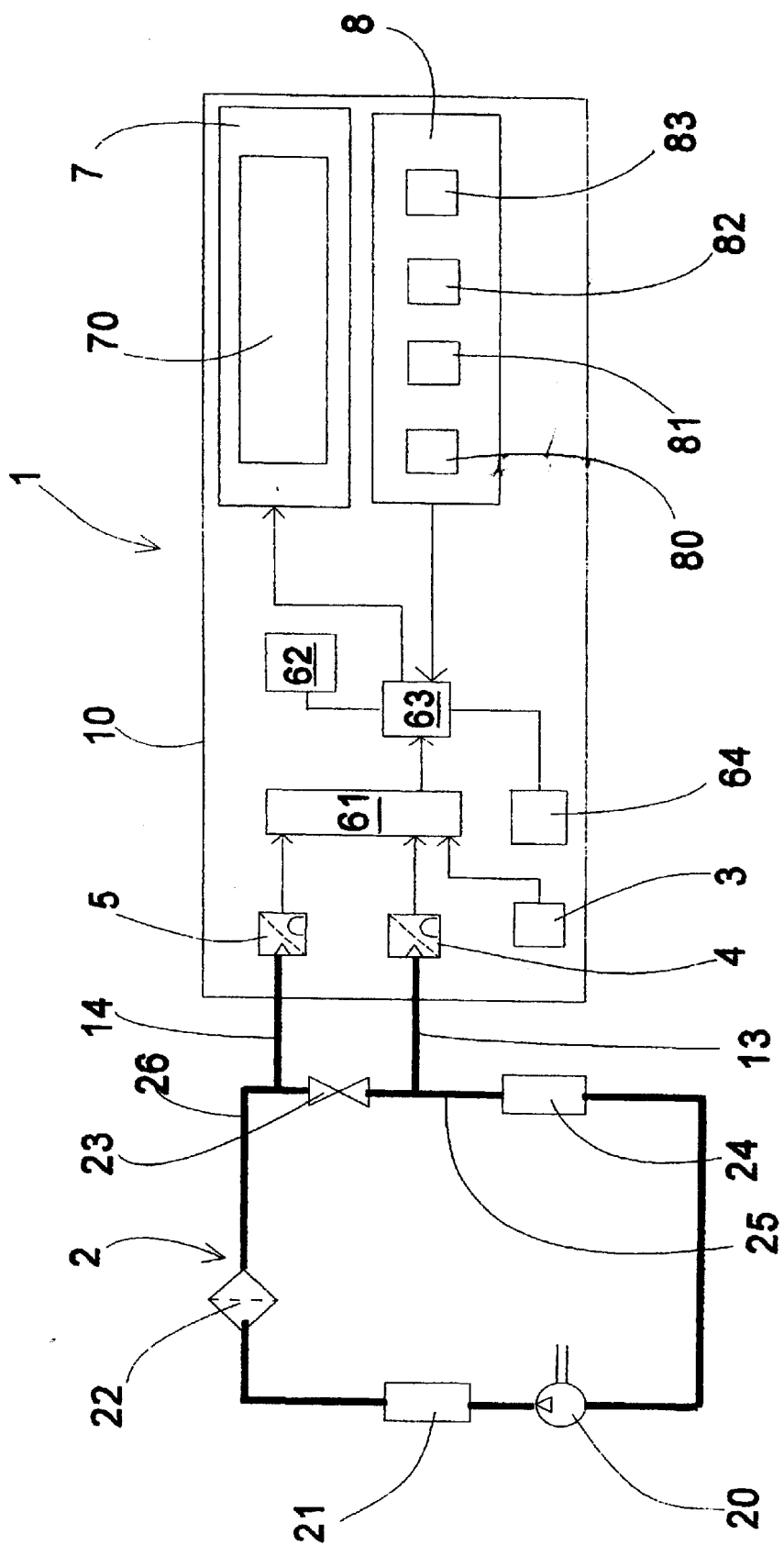

Referring to FIG. 1, there is shown a testing and diagnosing device 1 according to the invention connected to a typical automotive air conditioning system 2. The system includes a compressor 20, a condenser 21, a filter 22, an expansion valve 23 and an evaporator 24.

For purposes of charging and servicing, the system is usually provided with a pair of valve nipples (not shown) at the low 25 and high 26 pressure sides respectively.

The testing and diagnosing device comprises:

an ambient temperature transducer 3;

a low side pressure transducer 4, a high side pressure transducer 5;

an analog to digital converting unit 61 for converting the analog outputs of the transducer to digital signals;

a memory 62;

a digital signal processor 63 connected to the unit 61 and to the memory 62;

a display unit 7;

an input unit 8.

In a preferred embodiment (shown in FIG. 1) the device also comprises an I/O interface 64, preferably of type RS232, for connection with an external device such as printer or a personal computer. Advantageously all the above mentioned components of the device 1 are contained in a housing 10 described below in greater detail.

The device can be provided with external transducers(not shown) for sensing the refrigerant temperature before and after the evaporator 24. A further external transducer (not shown) can be provided for sensing the temperature at an air outlet of the conditioning system.

In the memory 62 are stored reference values of refrigerant pressures and ambient temperature for each kind of refrigerant (generally R-32 or R-134a) and a set of diagnosis with related checking or repair instructions. Preferably two sets of diagnoses are provided, for air conditioning systems having a compressor with fixed or variable capacity respectively.

The digital signal processor 63 is arranged to compare the input data from the pressure transducers 4,5 and the temperature transducer 3 with the values stored in the memory 62 and to associate to each tern of sensed values (ambient temperature, high and low pressures) at least a diagnosis, which is displayed on the display unit 7. The measured values are also displayed for testing purposes. Where the type of refrigerant or compressor is to be selected, this is done through the input unit 8. The digital signal processor 63 is also arranged to verify the operation of the transducers 3–5.

Figure 2:
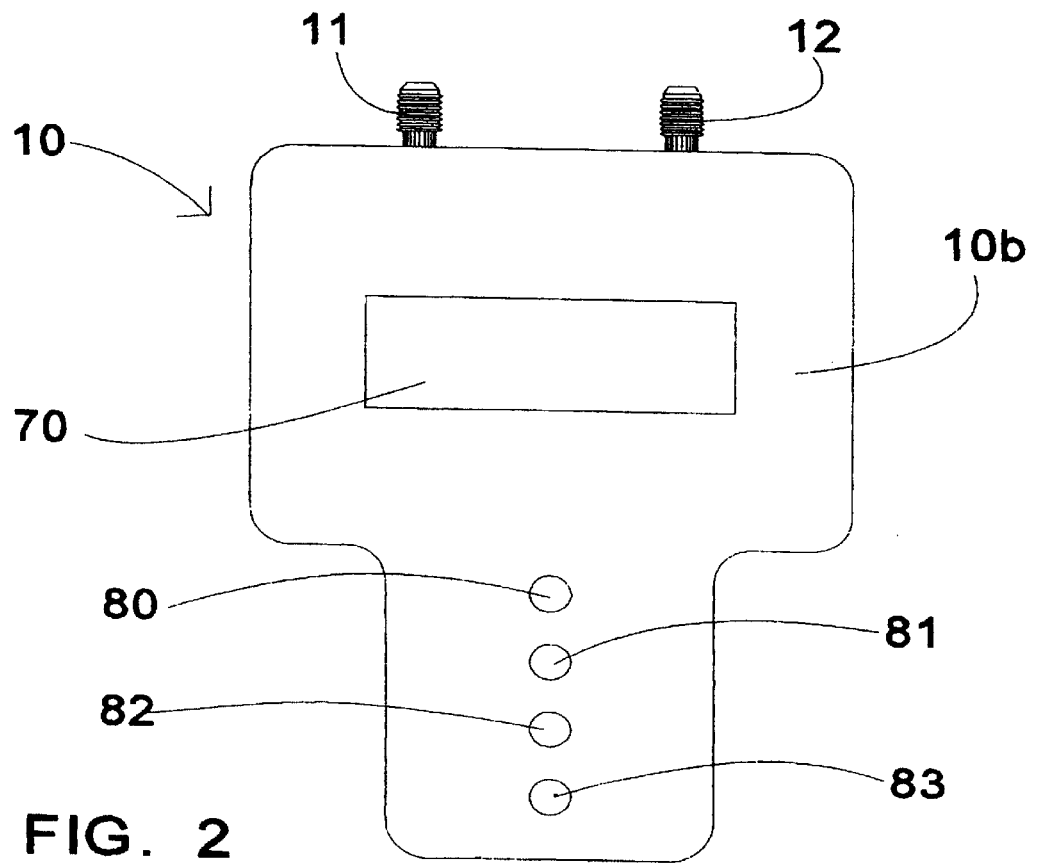
FIG. 2 is a plan view of a preferred embodiment of the hand-holdable housing of the device.
Figure 3:
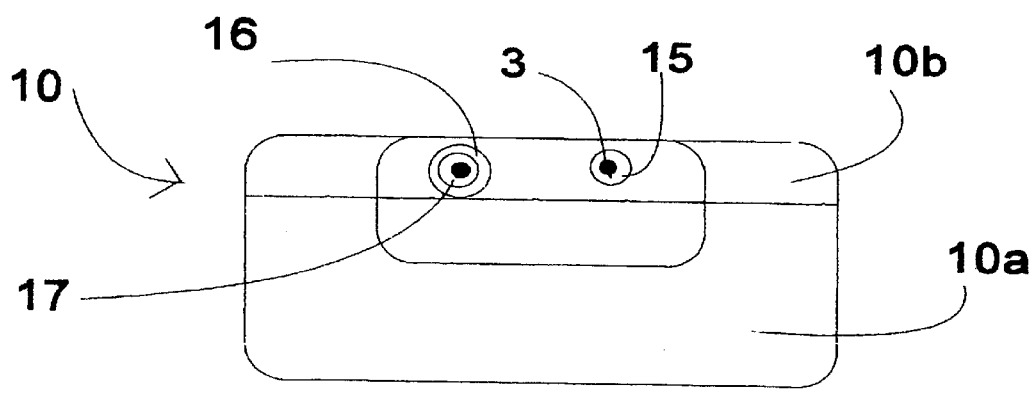
FIG. 3 is a front view of the housing of FIG. 2.

Referring now to FIGS. 2 and 3, there is shown a hand-heldable housing 10 for housing the components of the testing and diagnosing device. In a preferred embodiment (shown in FIGS. 2 and 3) the housing 10 is formed in two parts, a base 10a and a cover 10b, and is provided with nipples 11,12 for connecting the pressure transducers 4,5 to the low 25 and high 26 pressure sides of the system via hoses 13,14 (see FIG. 1).

Close to the temperature transducer 3, an opening 15 is provided in the housing for proper ambient temperature sensing. A further opening 16 is provided for connecting a low voltage connector 17 to a low voltage source (f.i. the car battery). A still further opening (not shown) is provided for connection with the I/O interface 64.

The cover 10b of the housing 10 is provided with the display 70 of the display unit 7 and with a plurality of input keys 80–83 of the input unit 8 (typically ON/OFF, RESET, ENTER, FORWARD).

The housing 10 can be made of plastic and, as it is clearly shown in FIGS. 2 and 3, has a practical hand-heldable form. Furthermore a device according to the present invention is light-weight and can be used by an inexperienced operator.

What is claimed is:

1. A method of testing and diagnosing an automotive air conditioning system comprising:

connecting a first pressure transducer to a high pressure side of an automotive air conditioning system, the first pressure transducer being housed in a hand-holdable housing of a testing and diagnosing device;

connecting a second pressure transducer to a low pressure side of the automotive air conditioning system, the second pressure transducer being housed in the hand-holdable housing of the testing and diagnosing device;

storing a set of reference values of refrigerant pressures at different temperatures for different refrigerants in a memory of the device;

storing a set of diagnoses based on said referrenre values;

sensing a high side pressure of the automotive air conditioning system; sensing a low side pressure of the automotive air conditioning system; sensing an ambient temperature;

associating the high side pressure, the low side pressure, and the ambient temperature with said set of reference values and matching with one of said set of diagnoses to form a diagnosis; and displaying the diagnosis on a display unit on the hand-holdable housing of the testing and diagnosing device.

2. The method of claim 1 further including the steps of storing said reference values of refrigerant pressures and ambient temperature for selected refrigerants.

3. The method of claim 1 further including the steps of preparing and storing different diagnoses for display on said display unit.

4. The method of claim 1 further including the step of converting an output of said first pressure transducer and said second pressure transducer to digital signals.

* * * * *